United States Patent [19]

Blizzard et al.

[11] Patent Number: 4,613,534

[45] Date of Patent: Sep. 23, 1986

[54] BONDING SURFACES WITH PERMANENT-BOND ADHESIVE

[75] Inventors: John D. Blizzard, Bay City, Mich.; Bernard VanWert, Norcross, Ga.

[73] Assignee: Dow Corning Corporation, Midland, Mich.

[21] Appl. No.: 694,481

[22] Filed: Jan. 23, 1985

Related U.S. Application Data

[63] Continuation of Ser. No. 513,504, Jul. 13, 1983, abandoned.

[51] Int. Cl.$^4$ .............................. B32B 3/00; C09J 5/02
[52] U.S. Cl. ............................................. 428/57; 52/2; 156/156; 156/157; 156/307.5; 156/315; 156/329; 427/407.3; 427/412.4; 428/246; 428/422; 428/447; 524/588
[58] Field of Search ............... 156/156, 315, 157, 329, 156/307.5; 524/588; 52/2; 427/407.3, 412.4; 428/57, 246, 422, 447

[56] References Cited

U.S. PATENT DOCUMENTS

| | | | |
|---|---|---|---|
| 2,736,721 | 2/1956 | Dexter | 260/42 |
| 2,814,601 | 11/1957 | Currie et al. | 428/447 |
| 3,063,882 | 11/1962 | Cheshire | 156/329 |
| 3,346,441 | 10/1967 | Bird | 428/57 |
| 3,639,155 | 2/1972 | Hartlein et al. | 428/447 |

*Primary Examiner*—John J. Gallagher
*Attorney, Agent, or Firm*—Edward C. Elliott

[57] ABSTRACT

This invention relates to a method of permanently bonding surfaces coated with elastoplastic organopolysiloxane resin or polytetrafluoroethylene resin. The method of bonding these difficult to adhere surfaces consists essentially of applying to the surface sufficient adhesive to yield at least a 0.1 mm coating of an adhesive comprising the product obtained by mixing (i) 9 to 70 percent by weight of a solid benzene soluble silicone resin copolymer, (ii) 30 to 91 percent by weight of a hydroxyl endlblocked polydiorganosiloxane gum having a viscosity of greater than 10,000 Pa·s, (iii) an organohydrogenpolysiloxane compatible with (i) and (ii), (iv) a soluble tin catalyst, and (v) a non-reactive solvent. The applied adhesive is allowed to become tacky, then the tacky surfaces are placed firmly together and allowed to cure. The cured, bonded seam possesses sufficient strength to allow the manufacture and use of fabric coated with these resins to be used in constructions such as air supported and tension supported roofs.

31 Claims, 2 Drawing Figures

BONDING SURFACES WITH PERMANENT-BOND ADHESIVE

This is a continuation of co-pending application Ser. No. 513,504, filed on July 13, 1983, now abandoned.

BACKGROUND OF THE INVENTION

1. Field of the Invention

This invention relates to a method of permanently bonding two surfaces, at least one surface being a resin selected from the group consisting of an elastoplastic organopolysiloxane resin and a polytetrafluoroethylene resin using a curable adhesive based upon polyorganosiloxanes, the method being useful in the production of air supported or tensioned structures.

2. Description of the Prior Art

In the construction of tension supported structures and air supported structures, it is necessary to fasten pieces of plastic sheet or coated fabric to each other to form seams and to fasten the pieces to the support structure. Seams have been made in thermoplastic sheets by heat fusion and by adhesive bonding. Fiberglass fabric coated with polyorganosiloxane has been used in outdoor applications such as greenhouses because of its excellent weatherability. Because it is a thermoset material the polyorganosiloxane coated fiberglass can not be bonded by heat fusion. Polyorganosiloxane coated fabric has been bonded together by the use of polydiorganosiloxane adhesives.

Adhesives of various types have been commercialized which are based upon silicone polymers. They have been successful because they adhere to a great variety of surfaces and because the adhesives themselves are able to function over a wide temperature range. Types of adhesives which have been commercialized include pressure sensitive adhesives, permanent adhesives and moisture curing one-part adhesives.

In U.S. Pat. No. 2,736,721, issued Feb. 28, 1956, Dexter teaches that a composition comprising a mixture of benzene soluble resin copolymer and a diorganopolysiloxane having a viscosity of at least 1,000 Pa.s gives excellent adhesives. His mixtures, which may also contain titanium esters and catalysts are used by applying the adhesive to a surface to be adhered, curing the adhesive, then placing the surfaces to be adhered together. The adhesive is stated to adhere to any known solid surface. When used to make adhesive tapes, they are of the class known as pressure sensitive adhesives. The tape with the cured adhesive is pressed firmly against a surface and adheres to it, there is no further cure required.

In U.S. Pat. No. 2,814,601, issued Nov. 26, 1957, Currie and Keil teach siloxane compositions which are useful as pressure sensitive adhesives and as permanent bond adhesives. Their compositions relate to a composition of matter composed essentially of a benzene soluble resin copolymer of $SiO_2$ units and $R_3SiO_{0.5}$ units and a hydroxyl end-blocked diorganopolysiloxane fluid of from 5 to less then 1000 Pa.s viscosity. To prepare an adhesive which will give a permanent bond, they include crosslinking agents which are alkylpolysilicates and/or hydrogen bearing siloxanes of the formula $R_nH_mSiO_{(4-n-m)/2}$ and a curing catalyst which includes metallic salts of carboxylic acids. The permanent bonds are formed by mixing the above ingredients shortly before use, commonly including a solvent, then coating the adhesive over each surface to be joined. The solvent is allowed to evaporate until a tacky film is obtained, then the two surfaces to be bonded are brought together, and the adhesive is allowed to cure.

SUMMARY OF THE INVENTION

The method of this invention provides a means for permanently bonding pieces of elastoplastic organopolysiloxane resin or polytetrafluoroethylene resin together or to another surface in a commercially practical manner. The surfaces to be bonded are coated with the curable polydiorganosiloxane adhesive described below, the coated surfaces dried until tacky, the tacky surfaces adhered together obtaining an initial load-bearing bond, then the adhesive is allowed to further cure to give a permanent bond. The method of this invention is useful in producing large, curved envelopes of coated fabric suitable for construction of tension supported or air supported structures. The curved envelopes are normally curved in all three dimensions. During the fabrication of such envelopes, pieces of resin coated fabric are fastened together at lapped seams to form the envelope. The edges to be overlapped to form the seam are usually curved in opposing directions in order to create the three-dimensionally-curved shape rather than a flat sheet. The coated fabric surrounding the lapped seam will rise up to accommodate the curvature, applying stress to the seam and tending to pull it apart. The seams must have sufficient initial strength as they are formed to resist the forces tending to pull apart the seam during the further handling and processing of the envelope. When the envelope is installed in the finished structure, the seams must then have sufficient strength to resist the dead load of the envelope itself and the live loads due to wind and snow. This method, using a polydiorganosiloxane based curable adhesive provides both the initial bond to allow fabrication and the long term strength to allow use in tension and air supported structures. The polydiorganosiloxane adhesive comprises the product obtained by mixing (i) 9 to 70 percent by weight of a solid benzene soluble resin copolymer consisting essentially of $R_3SiO_{\frac{1}{2}}$ units and $SiO_{4/2}$ units where R is a monovalent hydrocarbon radical or halogenated monovalent hydrocarbon radical containing no more than 6 carbon atoms, there being from 0.6 to 0.9 inclusive $R_3SiO_{\frac{1}{2}}$ units for every $SiO_{4/2}$ units, at least 95 percent of all R radicals in (i) being methyl; (ii) 30 to 91 percent by weight of a polysiloxane of the formula $HO(R_2SiO)_aH$ where R is as defined above, a has an average value such that (ii) has a viscosity of greater than 10,000 Pa.s at 23° C.; (iii) 0.75 to 8 parts by weight based upon 100 parts by weight of (i) plus (ii) of an organohydrogenpolysiloxane compatible with the mixture of (i) and (ii) and having an average unit formula $R_bH_cSiO(4-b-c)/2$ where R is as defined above, b has a value of from 1.00 to less than 2.00, c has a value of from 0.3 to 1.00, the sum of b plus c being from 1.30 to less than 3.00, there being an average of greater than two silicon bonded hydrogen atoms per molecule of (iii), no silicon atom bearing more than one silicon bonded hydrogen atom, the ratio of SiH units in (iii) to SiOH units in (i) plus (ii) being from 0.2/1 to 1/1, and the weight of hydrogen atoms present on silicon being less than 0.05 g per 100 g of (i) plus (ii); (iv) 0.5 to 2 parts by weight based upon 100 parts by weight of (i) plus (ii) of a soluble tin catalyst and (v) sufficient non-reactive solvent for the mixture of (i), (ii), (iii), and (iv), to yield a flowable adhesive having a combination of viscosity and solids content such that a single application of adhesive can yield an adhesive thickness of at least 0.1 mm.

It is an object of this invention to provide a method of permanently bonding pieces of coated fabric together so that envelopes suitable for tension and air supported structures can be commercially fabricated.

It is an object of this invention to provide a method of bonding pieces of fabric coated with polytetrafluoroethylene resin or elastoplastic organopolysiloxane resin together so that envelopes suitable for tension or air supported structures can be fabricated.

It is an object of this invention to provide a curable polydiorganosiloxane adhesive which has properties which make practical the construction of envelopes of elastoplastic organopolysiloxane resin or polytetrafluoroethylene resin coated fabric suitable for use in tension or air supported structures.

DESCRIPTION OF THE INVENTION

Figure 1:
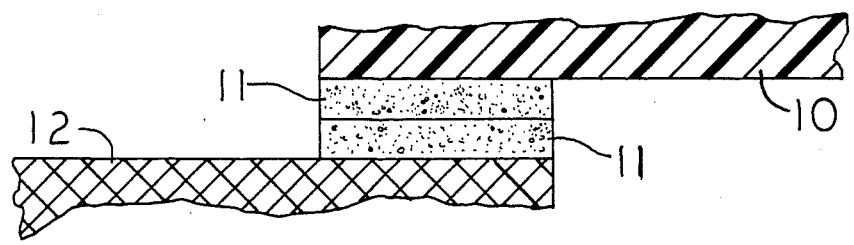
FIG. 1 illustrates an adhesive bond between a resin surface and an other surface.

This invention is a method of providing both an initial bond and a permanent bond of two surfaces, at least one surface being a resin selected from the group consisting of an elastoplastic organopolysiloxane resin and a polytetrafluoroethylene resin, comprising (A) applying to the surfaces to be bonded sufficient permanent-bond adhesive to yield a coating of at least 0.1 mm thickness per surface, the adhesive comprising the product obtained by mixing (i) 9 to 70 percent by weight of a hydroxyl radical containing solid benzene soluble resin copolymer consisting essentially of $R_3SiO_{\frac{1}{2}}$ units and $SiO_{4/2}$ units where R is a monovalent hydrocarbon radical containing no more than 6 carbon atoms, there being from 0.6 to 0.9 inclusive $R_3SiO_{\frac{1}{2}}$ units for every $SiO_{4/2}$ units, at least 95 percent of all R radicals in (i) being methyl, (ii) 30 to 91 percent by weight of a polydiorganosiloxane of the formula $HO(R_2SiO)_aH$ where R is as defined above, a has an average value such that (ii) has a viscosity of greater than 10,000 Pa.s at 25° C., (iii) 0.75 to 8 parts by weight based upon 100 parts by weight of (i) plus (ii) of an organohydrogenpolysiloxane compatible with the mixture of (i) and (ii) and having an average unit formula $R_bH_cSiO(4-b-c)/2$ where R is as defined above, b has a value of from 1.00 to less than 2.00, c has a value of from 0.3 to 1.00, the sum of b plus c being from 1.30 to less than 3.00, there being an average of greater than two silicon bonded hydrogen atoms per molecule of (iii), no silicon atom bearing more than one silicon bonded hydrogen atom, the mole ratio of SiH units in (iii) to SiOH units in (i) and (ii) being from 0.2/1 to 1/1, and the weight of hydrogen atoms present on silicon being less than 0.05 g per 100 g of (i) plus (ii), (iv) 0.5 to 2 parts by weight based upon 100 parts by weight of (i) plus (ii) of a soluble tin catalyst, and (v) sufficient non-reactive solvent for the mixture of (i), (ii), (iii), and (iv), to yield a flowable adhesive having a combination of viscosity and solids content such that a single application of adhesive can yield an adhesive thickness at least 0.1 mm, (B) allowing the solvent to evaporate until tacky adhesive surfaces are formed, then (C) placing the adhesive surfaces together while the adhesive is tacky, obtaining an initial load-bearing bond.

A relatively new method of enclosing large spaces makes use of an envelope of air-impermeable sheets of coated fabric or unreinforced plastic formed into a cover for the space, the envelope being supported by air pressure on the inside of the envelope. Another method of covering large spaces makes use of coated fabric panels placed in tension by supporting them from their edges while applying tension to the fabric in such a manner that the fabric is under tension from at least two different directions. Both of these methods require that a method of fastening coated fabric pieces together to form seams and to fasten the edges of the panels to their supporting structure be available in order to allow the fabrication of such structures.

Useful methods of fastening pieces together depend upon the characteristics of the pieces to be fastened. For instance, sheets of thermoplastic have been fastened by heat fusion and by adhesive bonding. Structures have been built using pieces of fiberglass fabric coated with polytetrafluoroethylene resin to make the fabric air impermeable and translucent. Seams between pieces of such coated fabric were bonded together by heat fusing the coating.

A new coated fabric based upon a coating of polyorganosiloxane was developed because of the excellent weatherability of such coatings. Because the polyorganosiloxanes used as coatings are thermosetting materials, fastening methods based on heat fusion were not usable and new methods of fastening had to be developed. In order to be practical, the fastening method must allow pieces of coated fabric to be attached to each other to form a seam in a manner that provides sufficient strength to the seam as soon as the seam is formed. The seam must have sufficient strength to resist the stress on the seam induced by the curved shape of the lapped seam edges and hence prevent the seams from pulling apart, and the pieces forming the seam must remain attached to each other while the fabrication of the envelope procedes. Because the envelopes are normally of an elliptical shape, the seams are placed under stress due to the weight of the fabric and the movement of the fabric during the fabrication process. Preferably, a seam has an initial bond having a peel strength of at least 7.5 kg per meter of seam width in order to assure that the newly formed seam does not come apart during the fabrication of the envelope.

When the envelope is installed in the structure, the seams are stressed by the loads placed on the envelope from the tension placed on the envelope due to both dynamic and static loads. A seam having a permanent bond having a lap shear strength of at least 2500 kg per meter of width for a seam which is lapped over for 50.8 mm is useful in construction of air supported structures.

A method of fastening pieces of coated fabric together in a seam through the use of a curable permanent-bond polyorganosiloxane adhesive was developed and is the present invention which provides the necessary seam strength during fabrication and during use.

The coated fabric used in the construction of air supported and tension supported structural roofs is required to possess certain characteristics. One of the necessary properties of such coated fabric is a long life when exposed to the elements. For this reason, the fabric used is constructed of fibers that are not degraded by exposure to sunlight. Preferred fibers are polyester fibers and glass fibers with glass fibers most preferred because they do not degrade from exposure to sunlight. They are also preferred because they have a high tensile strength and very low elongation so the fabric does not stretch under load. The fabric is coated to create a membrane which is air tight. The material used to coat the fabric also is required to have a long useful life when exposed to the elements. Two materials known to possess very good resistance to degradation when exposed to sunlight, rain, snow, windblown sand, etc. are polytetrafluoroethylene resin and elastoplastic organopolysiloxane resin. These materials can be used to coat fabric for use in buildings such as greenhouses as well as in air supported and tension supported roofs for covering large areas such as stadiums, public buildings, arboretums, and ponds.

Fabric coated with polytetrafluoroethylene resin is commercially available. Such fabric has been used to construct roofs such as those described above. The surface of the coated fabric consists essentially of polytetrafluoroethylene or a copolymer such as fluorinated ethylene-propylene. This class of resins is noted for its low surface energy. Because of the low surface energy surface, it is very difficult for anything to bond or adhere to the surface. Coated fabric made using these resins remains clear when exposed to the elements because dirt does not adhere to the surface.

Because the fluorinated surface is difficult to bond to, seams have been formed in this type of coated fabric by sewing or by heat sealing. Heat sealing is possible because the fluorinated ethylene and ethylene-propylene resins are thermoplastic materials. The method of this invention has been found suitable for producing seams in this type of coated cloth because the unique adhesive used in the method will bond to fluorinated ethylene and ethylene-propylene surfaces with sufficient strength to produce a useful seam.

Fabric coated with elastoplastic organopolysiloxane resin is also commercially available. An elastoplastic organopolysiloxane resin is a curable resin based upon organopolysiloxane that has an ultimate elongation of at least 50 percent and a surface which does not attract and hold dirt. The ratio of organic groups to silicon atoms is less than 1.8 organic groups to each silicon atom. Silicone resin, such as that described in U.S. Pat. No. 3,639,155, issued Feb. 1, 1972, to Hartlein and Vincent, has been used to coat glass fabric for use in greenhouses. This type of coated fabric proved to have very satisfactory weathering properties, but it was too stiff. The coated fabric eventually broke or tore at the edges where it was clamped. It also had a poor resistance to tear. Modified fabrics were then produced by first coating the glass cloth with a silicone elastomer and then overcoating the elastomer with silicone resin of the type described in the Hartlein et al. patent. Because this type of silicone resin is thermosetting, seams cannot be formed by heat sealing. Seams must be formed by sewing or by bonding. Sewing produces a seam having physical strength immediately, but the sewing process creates holes in the fabric which must be subsequently sealed to ensure a weather proof seam.

Silicone resins and elastomers are commonly used to coat surfaces to provide a release coating; that is, a coating that is not easily adhered to. This characteristic of silicone polymers does not suggest the forming of seams by adhesive bonding. The unique adhesive used in the method of this invention has been found to bond to a resin surface from a cured coating comprising an organopolysiloxane block copolymer composition such as described in the above referenced Hartlein et al. patent, hereby incorporated by reference. The surface of such a coated fabric comprises the cured product obtained by exposing to atmospheric moisture a composition comprising an organosiloxane block copolymer consisting essentially of (F) 40 to 75 inclusive mol percent of diorganosiloxane units wherein the diorganosiloxane units are bonded through silicon-oxygen-silicon bonds forming a polydiorganosiloxane block having an average of from 15 to 350 inclusive diorganosiloxane units per block, said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units; (G) 15 to 50 inclusive mol percent organosiloxane units having an average formula $$R_xSiO_{(4-x)/2}$$

where x has a value of from 1 to 1.3 inclusive and R is an organic group selected from the group consisting of aryl radicals, vinyl radicals, methyl radicals, ethyl radicals and propyl radicals, said organic groups being at least 50 percent aryl radicals based on the total number of organic groups in (G), said organosiloxane units comprise a block of at least three organosiloxane units and said organosiloxane units being selected from monoorganosiloxane units and diorganosiloxane units; and (H) 3 to 25 inclusive mol percent of end-blocking siloxane units of the formula $$R'SiY_yO_{(3-y)/2}$$

where y has an average value from 1.8 to 2 inclusive, R' is an organic radical selected from the group consisting of alkyl radicals having from one to five inclusive carbon atoms, phenyl radicals and vinyl radicals and Y is a monovalent radical selected from the group consisting of acetoxy radicals, alkoxy radicals having from one to five inclusive carbon atoms per radical, and radicals of the formula —O—N=X wherein X is selected from the group consisting of radicals of the formula

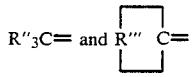

in which each R''' is selected from the group consisting of divalent hydrocarbon radicals and halogenated divalent hydrocarbon radicals and each R'' is a radical selected independently from the group consisting of monovalent hydrocarbon radicals and halogenated monovalent hydrocarbon radicals, the mole percentages of (F), (G), and (H) being based on the total number of siloxane units in the organosiloxane block copolymer. A preferred organopolysiloxane block copolymer is one in which (F) is present in an amount of from 50 to 70 inclusive mole percent and the polydiorganosiloxane is polydimethylsiloxane having from 25 to 100 dimethylsiloxane units per block, (G) is present in an amount of from 20 to 40 inclusive mole percent and the aryl radicals are phenyl radicals, and (H) is present in an amount of from 4 to 20 inclusive mole percent.

The method of this invention is illustrated by the drawings. FIG. 1 illustrates the general case in which one surface 10 which is a resin selected from the group consisting of an elastoplastic organopolysiloxane resin and a polytetrafluoroethylene resin is bonded to another surface 12 by a permanent-bond adhesive 11. The permanent-bond adhesive 11 is first applied to each surface, 10 and 12, in a thickness that will yield a film of adhesive after removal of any solvent of at least 0.1 mm, preferably from 0.2 mm to 0.3 mm. The adhesive is allowed to dry until the adhesive surface becomes tacky, then the tacky adhesive surfaces are placed together, forming an initial load-bearing bond as soon as the surfaces are firmly forced together. The adhesive continues to cure so that the bond becomes a permanent bond. The other surface 12 can be of any nature such as metal, stone, cement, plastic, or another resin surface 10.

Figure 2:
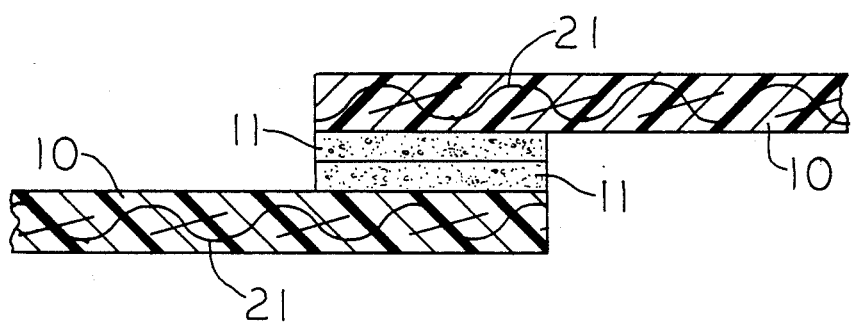
FIG. 2 illustrates an adhesive bond between two resin membranes, the resin being reinforced with fabric.

FIG. 2 illustrates a particular case in which two resin surfaces 10 as described above are bonded together by the permanent-bond adhesive 11. In this case, the resin surfaces 10 are formed by resin which has been reinforced by fabric 21. This case illustrates the construction of a seam in a fabric reinforced resin membrane such as would be formed in the construction of an envelope of coated fabric suitable for use in air supported structures or tension supported structures.

The permanent-bond adhesive used in the method of this invention comprises the product obtained by mixing (i) 9 to 70 percent by weight of a solid benzene soluble resin copolymer consisting essentially of $R_3SiO_{\frac{1}{2}}$ units and $SiO_{4/2}$ units where R is a monovalent hydrocarbon radical containing no more than 6 carbon atoms, there being from 0.6 to 0.9 inclusive $R_3SiO_{\frac{1}{2}}$ units for every $SiO_{4/2}$ units, at least 95 percent of all R radicals in (i) being methyl; (ii) 30 to 91 percent by weight of an essentially cyclic free polydiorganosiloxane of the formula $HO(R_2SiO)_aH$ where R is as defined above, a has an average value such that (ii) has a viscosity of greater than 10,000 Pa.s at 23° C.; (iii) 0.75 to 8 parts by weight based upon 100 parts by weight of (i) plus (ii) of an organohydrogenpolysiloxane compatible with the mixture of (i) and (ii) and having an average unit formula $R_bH_cSiO(4-b-c)/2$ where R is as defined above, b has a value of from 1.00 to less than 2.00, c has a value of from 0.3 to 1.00, the sum of b plus c being from 1.30 to less than 3.00, there being an average of greater than two silicon bonded hydrogen atoms per molecule of (iii), no silicon atom bearing more than one silicon bonded hydrogen atom, the mole ratio of SiH units in (iii) to SiOH units in (i) and (ii) being from 0.2/1 to 1/1, and the weight of hydrogen atoms present on silicon being less than 0.05 g per 100 g of (i) plus (ii); (iv) 0.5 to 2 parts by weight based upon 100 parts by weight of (i) plus (ii) of a soluble tin catalyst; and (v) a non-reactive solvent for the mixture of (i), (ii), (iii), and (iv), to yield a flowable adhesive having a combination of viscosity and solids content such that a single application of adhesive can yield an adhesive thickness at least 0.1 mm.

Ingredient (i) is a known resin copolymer which has been used as an ingredient in silicone pressure sensitive adhesives. It is described in U.S. Pat. No. 2,736,721, issued Feb. 28, 1956, to Dexter and in U.S. Pat. No. 2,814,601, issued Nov. 26, 1957, to Currie and Keil, both of which are incorporated by reference to describe ingredient (i) and how to manufacture it. A preferred method of manufacture of ingredient (i) is that described in U.S. Pat. No. 2,676,182, issued Apr. 20, 1954 to Daudt and Tyler. Briefly, the method of Daudt and Tyler comprises reacting under acidic conditions, a silica hydrosol with organo substituted siloxanes, for example, hexamethyldisiloxane, or hydrolyzable organosubstituted silanes, for example, trimethylchlorosilane, or their mixtures and recovering a benzene soluble resin copolymer having $R_3SiO_{\frac{1}{2}}$ units (M) and $SiO_{4/2}$ units (Q).

Regardless of the method of preparation, the weight of the resin copolymer (i) and the ratio of M units to Q units in the resin copolymer (i) that is used in this invention is based on the non-volatile portion of the resin copolymer. To determine the non-volatile portion of the resin copolymer a known weight of resin copolymer, as prepared, preferably dissolved in a volatile solvent such as toluene or xylene is heated at 150° C. for 3 hours to yield a residue. The non-volatile portion of the resin copolymer is the residue. The amount of the non-volatile portion of the resin copolymer is based on the weight of the organic solvent solution of the resin copolymer and is expressed as "percent solids".

The R groups in the M units of (i) which may be identical or different, are monovalent hydrocarbon radicals containing no more than six carbon atoms such as alkyl radicals such as methyl, ethyl, and isopropyl; cycloaliphatic radicals such as cyclopentyl and cyclohexenyl; olefinic radicals, such as vinyl and allyl; and the phenyl radical. Typical M units are $Me_3SiO_{\frac{1}{2}}$, $EtMe_2SiO_{\frac{1}{2}}$, and $EtPhMeSiO_{\frac{1}{2}}$ where Me is methyl, Et is ethyl, and Ph is the phenyl radical. Up to 0.5 percent of all R radicals in (i) can be olefinically unsaturated, such as vinyl. The Q units in (i) are siloxane units containing no silicon bonded carbon atoms and are derived directly from the silica hydrosol in the preferred method of Daudt and Tyler. The resin copolymers (i) of this invention can have as much as 3 to 4 percent by weight, based on the total weight of (i), of hydroxyl radicals bonded directly to the silicon atom of the Q units. The amount of said hydroxyl radical is dependent upon the method of preparation of the resin copolymer.

Resin copolymers (i) that are operable in this invention are soluble in benzene and have a ratio of M units to Q units whose value is from 0.6:1.0 to 0.9:1.0. The M/Q ratio in (i) can be determined by one or more standard analytical techniques such as elemental analysis, infra-red spectroscopy, nuclear magnetic resonance spectroscopy, etc. For example, in a resin copolymer having only trimethylsiloxane units and silica units, a knowledge of the percent by weight of carbon in the resin copolymer (i) is sufficient to establish its M/Q ratio.

The preferred adhesives of this invention are obtained when copolymer (i) consists essentially of $Me_3SiO_K$ units and $SiO_{4/2}$ units. It is to be understood that trace amounts of diorganosiloxane units and monoorganosiloxane units are within the scope of this invention as components in resin copolymer (i).

Ingredient (ii) is a polydiorganosiloxane of the formula $Ho(R_2SiO)_aH$ where R is as defined above and a has an average value such that (ii) has a viscosity of greater than 10,000 Pa.s at 23° C. These hydroxyl endblocked polydiorganosiloxane gums are linear polymers which are essentially cyclic free and are well known products and can be manufactured by means well known to those skilled in the art.

Ingredient (iii) is a crosslinker used to combine with the resin (i) and gum (ii) described above to produce a cured and crosslinked adhesive. When the stated ratios of (i) and (ii) are mixed with ingredient (iii) and catalyst (iv) and allowed to cure, the result is a cured adhesive. The combination, when cured, does not produce a pressure sensitive adhesive such as is produced in the Dexter patent and the Currie et al. patents cited above.

Ingredient (iii) is an organohydrogenpolysiloxane compatible with the mixture of (i) and (ii) and having the average unit formula $R_bH_cSiO_{(4-b-c)/2}$ where R is as defined above, b has a value of from 1.00 to less than 2.00, c has a value of from 0.3 to 1.00, the sum of b plus c being from 1.30 to less than 3.00, there being an average of greater than two silicon bonded hydrogen atoms per molecule of (iii), no silicon atom bearing more than one silicon bonded hydrogen atom. The restriction of no silicon atom bearing more than one silicon bonded hydrogen atom is present in the description of (iii) because in cases where two hydrogen atoms are present on silicon, the second hydrogen atom is very reactive as compared to the case when only one hydrogen is present. This restriction in not intended to exclude the incidental presence of more than one hydrogen on a silicon atom of (iii) that may be present due to manufacturing impurities. In order to be effective for this invention, ingredient (iii) must be compatible with, and preferably soluble in the mixture of (i) and (ii). By "compatible" it is meant that the required amount of organohydrogenpolysiloxane (iii) is at least partially soluble in the mixture of (i) and (ii) and will exist in a uniformly dispersed state in the composition of this invention. Illustrative of ingredient (iii) are $Si(OSiHMe_2)_4$, $Me_3SiO(Me_2SiO)_3(MeHSiO)_5SiMe_3$, $HMe_2SiO(Me_2SiO)_5(MeHSiO)_3SiMe_2H$, $Me_3SiO(MeHSiO)_{10}SiMe_3$, $Me_3SiO(MeHSiO)_{60}SiMe_3$, $(MeHSiO)_{3,4,5}$, $Si(OSiPhMeH)_4$, and their several mixtures including mixtures with other polyorganosiloxanes having less than 3 silicon bonded atoms per molecule. R in ingredient (iii) is preferably all methyl radical.

Ingredient (iv) is a soluble tin catalyst which acts as a catalyst to increase the rate of cure of the mixture. The preferred catalysts are organic tin salt compounds, preferably diorganotindicarboxylate. Diorganotindicarboxylates include dibutyltindiacetate, dibutyltindilaurate, and dioctyltindilaurate. The preferred catalyst is dibutyltindiacetate.

Ingredient (v) is a non-reactive solvent for the mixture of (i), (ii), (iii), and (iv). Suitable solvents include aliphatic hydrocarbon solvents such as toluene and xylene and cyclic polysiloxanes such as cyclic octamethyltetrasiloxane. The solvent should be non-reactive with the ingredients, capable of dissolving or dispersing the ingredients uniformly, and of a vapor pressure such that it evaporates in a reasonable length of time when the adhesive is applied to the coated fabric. Toluene, xylene and VM and P naptha are preferred solvents because of their suitable evaporation rates, availability, and non-reactivity with the other ingredients. Sufficient non-reactive solvent is added to yield a flowable mixture, that is the adhesive mixture, when applied to the surface to be bonded, must flow enough so that the surface is thoroughly wetted. Many surfaces are rough, at least on a microscopic basis, and the adhesive needs to flow so that the entire surface is wetted and any air present is displaced so that the entire surface is bonded in order to obtain the most satisfactory bond. The maximum amount of solvent that is useful is determined by the requirement that a single application of the adhesive yield an adhesive thickness after drying of at least 0.1 mm. This is felt to be the practical minimum thickness that assures complete contact between the surfaces being bonded by allowing for an amount of surface unevenness. When applying the adhesive in a wet thickness such as from 0.1 to 0.5 mm, the adhesive must be of sufficient viscosity that it does not flow out of place. The amount of solvent can be varied to obtain a desired viscosity because the viscosity will depend on the combination of solvent chosen, and the molecular weight and amount of the ingredients (i), (ii), (iii), and (iv), as well as the presence of any other incidental ingredients such as pigment or filler.

The adhesive of this invention can also contain small amounts of ingredients such as reinforcing filler, pigments, and heat stability agents such as are ordinarily used in silicone polymer based products. The additional ingredients and their amounts should be carefully tested to insure that they do not adversely effect the adhesive bonding.

The adhesive of this invention comprises the product obtained by mixing ingredients (i), (ii), (iii), (iv), and (v) together. Because the adhesive cures at room temperature after all the ingredients are mixed together, it is preferred to use the adhesive as a three part system. Resin (i), gum (ii), and solvent (v), are combined in the stated ratios to form a base mixture by mixing at room temperature. The resin and gum may be made more compatible by adding a condensation catalyst such as the reaction product of tetramethylguanidine and 2-ethylhexanoic acid, but this is not required for the adhesive of this invention. The mixture of resin, gum, and solvent in the required ratios is similar to the mixtures used commercially as silicone pressure sensitive adhesives. When used as pressure sensitive adhesives, the mixtures are catalyzed with a catalyst such as benzoyl peroxide, applied to a substrate, and heated to dry the adhesive and cure it into a useful pressure sensitive material. A pressure sensitive adhesive is one which cures to give a permanently tacky surface which can be subsequently adhered to a surface by merely applying it to the surface under pressure. Another characteristic of a useful pressure sensitive adhesive is the ability of the adhesive to be peeled off the surface without leaving adhesive adhered to the surface and be able to retain the tacky surface on the adhesive. This combination of characteristics allows such an adhesive to be applied to a surface, such as a tape, be cured, and rolled up for storage. The adhesive tape can then be later unrolled (the pressure sensitive adhesive releasing from the back side of the tape) and then readhering to a surface. The familiar cellophane tape is an example of a pressure sensitive adhesive used on a tape. It is presently believed that any of the present commercial silicone pressure sensitive adhesive base materials could be used as the mixture of (i), (ii), and (iii) providing that the ratio of resin (i) to gum (ii), and the characteristics of the resin and gum, fall within the limits required by this invention.

A preferred mixture of (i), (ii), and (v) comprises from 10 to 60 percent by weight of resin (i), from 40 to 90 percent by weight of gum (ii), and sufficient hydrocarbon solvent to give an adhesive solids content of from 40 to 60 percent by weight, based upon 100 parts by weight of resin (i) plus gum (ii).

When the mixture of (i), (ii), and (v) is combined with the required amount of crosslinker (iii) and catalyst (iv) a room temperature curable adhesive results. The amount of crosslinker (iii) is from 0.75 to 8 parts by weight based upon 100 parts by weight of resin (i) plus gum (ii). The amount of crosslinker used is chosen so that the mole ratio of SiH units in the crosslinker (iii) is from 0.2 to 1 of the SiOH units in resin (i) and gum (ii). The adhesive does not have the desired physical properties when the ratio is outside of these limits. When the ratio is below 0.2/1, the initial peel strength of the adhesive is too low to be useful in the method of this invention. When the ratio is above 1/1, the adhesive cures too quickly and the mixture cannot be conveniently mixed and applied in the method of this invention. Even though the ratio of SiH to SiOH is within the required range, the adhesive will not function properly in the method of this invention unless the amount of hydrogen atoms present on silicon are less than 0.05 grams per 100 grams of resin (i) plus gum (ii). If more than this amount of hydrogen on silicon is available in the mixture, the adhesive becomes too crosslinked and the adhesive becomes too stiff to function properly in the method of this invention. Preferred as crosslinker in the adhesive of this invention is from 2 to 6 parts by weight of organohydrogenpolysiloxane in which R is methyl, b has a value of from 1.05 to 1.4, c has a value of from 0.45 to 0.97, and b plus c has a value of from 1.6 to 2.1. Most preferred is a crosslinker of the average formula $Me_3SiO(MeHSiO)_{50-60}SiMe_3$ in an amount of from 2 to 3 parts by weight per 100 parts by weight of resin (i) plus gum (ii).

The crosslinker (iii) can be mixed into the base mixture of resin (i), gum (ii), and solvent (v) and stored before use, resulting in a two part system. The catalyst (iv) is then added at the time of use. The crosslinker (iii) and catalyst (iv) cannot be mixed together as they will react and no longer be useful in the adhesive.

The curing of the adhesive is accelerated by catalyst (iv). An amount of catalyst between 0.5 and 2 parts by weight based upon 100 parts by weight of resin (i) plus gum (ii) has been found to be useful. Too little catalyst does not accelerate the cure enough to give the desired initial peel strength. An initial peel strength is required by the method of this invention that is high enough to make the fabrication of seams in coated fabric practical for uses such as air supported or tension supported roofs. Too much catalyst causes the adhesive to cure so rapidly that it cures during the time required for steps (A) and (B) to a point where the adhesive is no longer tacky enough for the adhesive coated surfaces to bond together to give the necessary seam strength. The preferred amount of catalyst is from 0.5 to 1.5 parts by weight using the preferred dialkyltindicarboxylate such as dibutyltindiacetate.

The method of this invention provides a means of producing seams in fabric coated with polytetrafluoroethylene resin or with elastoplastic organopolysiloxane resin. Both of these types of materials are very difficult to bond to, necessatating the development of a specific adhesive for this use. The adhesive must form a bond to these surfaces within a short period of time after application to the seam area so that the seam can be formed by forcing the two surfaces together and the bond must be sufficient to hold the two pieces of coated fabric together as the seaming process continues. The fully cured adhesive must firmly bond the pieces of coated fabric together with sufficient strength to prevent the peeling apart or shearing of the seam during use of the structure. Pressure sensitive adhesives are not suitable for the method of this invention because they do not ordinarily produce an adhesive that has sufficient initial peel strength without first heat curing the adhesive in place on the substrate. Pressure sensitive adhesives also fail in the method of this invention because they do not possess sufficient lap shear strength. The pressure sensitive adhesives are essentially a very high viscosity fluid so that the tacky, pressure sensitive characteristic is retained. When subjected to a constant shear load, they gradually flow so that the seam shears apart under load. The adhesive of this invention is crosslinked and cured after the seam is formed so that the seam maintains the required strength. The adhesive of this invention is not a pressure sensitive adhesive.

The first step in the method of this invention consists essentially of applying the adhesive of this invention to each surface to be bonded in an amount sufficient to yield a coating thickness after drying of at least 0.1 mm. Because coated fabric often has a surface which is not completely smooth, it is necessary to have sufficient adhesive present to fill in any irregularities in the coated fabric surface in the seam area so that the complete seam area is fully adhered. Thicker adhesive films have been used up to about 0.3 mm thick. Thick films do not give any better bonding and if too much adhesive is used, i.e., an appreciable amount over 0.3 mm thickness, the adhesive layer could become the weak point in the bonded seam when subjected to stress.

After the adhesive is applied to the surface of the coated fabric at the seam area, the solvent is allowed to dry until the adhesive surface is tacky to the touch. The adhesive should not "string" when the surface is touched with the finger and then withdrawn. Under normal room temperature conditions an adhesive made with xylene as the solvent requires between 15 to 60 minutes to reach the desired degree of dryness. The drying time can be reduced by blowing hot air over the adhesive surface to accelerate the drying process. The required rate of cure of the adhesive is related to the drying rate of the adhesive in that the adhesive must dry before it becomes cured in order to obtain the desired tacky surface for bonding the two surfaces together. If the adhesive becomes too fully cured before bonding the two surfaces together, the adhesion will be insufficient. If a catalyst such as uninhibited platinum is used, the cure is too rapid. The rapid curing adhesive becomes too crosslinked before the solvent has evaporated and the adhesive surfaces will no longer bond together with sufficient strength. If a catalyst such as zinc octoate is used, the cure system is too slow and the seam can not be joined together for a period of several hours. When an adhesive system was made up of a resin and gum mixture catalyzed with a moisture activated curing system comprising a mixture of methyltriacetoxysilane and ethlytriacetoxysilane with dibutyltindiacetate catalyst, the surface of the adhesive cured during the drying of the solvent so that the two adhesive surfaces were no longer tacky and would not bond together after the solvent had evaporated. The cure system of the adhesive of this invention allows the adhesive to be applied, dried, adhered, and then cured in the manner required in the method of this invention.

After the adhesive surface reaches the required "tacky" stare, the two surfaces are placed together under enough pressure to insure intimate contact of the adhesive surfaces. Once such contact is established, the pressure can be removed because the adhesive surfaces will remain bonded together. A convenient method of bonding is placing the surfaces together and then rolling a metal roll over the seam area to force the air out from between the adhesive surfaces. The adhesive of this invention, when used to bond fabric coated with an elastoplastic organopolysiloxane resin, will give an initial peel strength of at least 7.5 kilograms per metre of width when tested one hour after application of the adhesive to the coated cloth. The peel strength is measured in accordance with ASTM D 1000, using an extension rate of 50.8 mm per minute and a sample of 25.4 mm width. It has been determined that seams having an initial peel strength of this value can be formed and then the seamed fabric can be moved about and further processed without difficulty because the seams will remain bonded. The curing of the adhesive can be accelerated by heating, if desired, but the seam must be held under pressure while it is heated to insure that the volatile byproducts present in the adhesive and produced by the cure do not force the seam apart during the curing process. Heat sealing type equipment has been used to rapidly produce cured seams by holding the seams under pressure while applying heat to the seam.

The bonding method is completed by allowing the adhesive to fully cure. At room temperature, the adhesive can develop a full cure in 7 days. The adhesive of this invention, when used to bond fabric coated with an elastoplastic organopolysiloxane resin, will give an aged lap shear strength for a 50.8 mm lap of at least 2500 kilograms per metre of width. The lap shear is measured in accordance with ASTM D 1363, using an extension rate of 50.8 mm per minute and a sample of 25.4 mm width. It has been determined that seams having an aged lap shear strength of this value can be successfully used in the construction of air supported and tension supported roofs.

The method of this invention, using the adhesive of this invention, allows fabric coated with polytetrafluoroethylene resin or an elastoplastic organopolysiloxane resin to be bonded at seams so that the seams have sufficient strength both as bonded and after aging to allow the use of the coated fabric in roofs such as in air supported roofs and tension supported roofs. The coated fabric is also useful in constructing greenhouses, covers for tennis courts, etc. because the coated fabric is translucent and allows the passage of light. Because the cured adhesive is as resistant to the effects of weathering as the coated fabric, the finished structure has a long, useful life.

It is thought that the method of this invention can also be used to bond the coated fabric to the cables and/or framework making up the structure being built. The adhesive would be applied to the coated fabric and to the surface of the cable or framework in the required amount, then allowed to dry until tacky, then the adhesive surfaces would be adhered together and allowed to cure to produce a bonded seam.

The following examples are included for illustrative purposes only and should not be construed as limiting the invention which is properly set forth in the appended claims.

EXAMPLE 1

A series of adhesives were prepared for evaluation in bonding coated fabric seams.

The adhesives were prepared by first mixing together the amounts of hydroxyl endblocked polydimethylsiloxane gum, solid, benzene soluble resin copolymer, and xylene, shown in the Table. Also mixed into each composition was 1.96 g of isopropyl alcohol and 0.16 g of a condensation catalyst consisting of the reaction product of 115 parts by weight tetramethylguanidine and 144 parts by weight 2-ethylhexanoic acid in 1036 parts by weight xylene. The ingredients were mixed at room temperature then aged at room temperature for from 48 to 72 hours.

The hydroxyl endblocked polydimethylsiloxane gum was a commercially prepared gum having a Williams plasticity number of about 145 when measured according to ASTM D 926. This corresponds to a viscosity of about 19,000 Pa.s at 25° C. It contained about 0.0017 percent OH by weight.

The benzene soluble resin copolymer was prepared according to U.S. Pat. No. 2,676,182, by combining a sodium silicate solution and trimethylchlorosilane to give a resin having a carbon content of about 22 percent by weight and a hydroxyl content of about 2.8 percent by weight. Assuming the carbon to be present as trimethylsiloxane units, the resin had a ratio of trimethylsiloxy units to $SiO_2$ units of about 0.77 to 1. The resin was used as a 70 percent by weight solids solution in xylene. One solution, diluted to 60 percent solids with xylene, had a viscosity of about 0.03 Pa.s at 23° C. and a specific gravity of about 1.036.

After the aging period, each mixture was mixed with 1 g of trimethylsiloxy endblocked polymethylhydrogensiloxane crosslinker with a silicon-bonded hydrogen atom content of about 1.6 weight percent and 0.25 g of dibutyltindiacetate-catalyst, giving the parts of each per 100 parts of the combined weight of gum and resin shown in the Table.

Immediately after mixing, each catalyzed mixture was coated onto 10x13 cm pieces of coated glass fabric with a doctor blade to a wet film thickness of 0.38 mm. The coated glass fabric had an outer surface of elastoplastic organopolysiloxane resin comprising the cured product obtained by exposing a monomethyldimethoxysiloxy endblocked organopolysiloxane block copolymer having about 70 mol percent dimethylsiloxane units and about 30 mol percent monophenylsiloxane units in the copolymer to the atmosphere. The cured resin had an ultimate elongation of about 60 percent. The wet film of adhesive was allowed to air dry until the adhesive mixture did not "string" when touched with the fingertip, a period of approximately 1 hour. The adhesive layer was then about 0.27 mm thick. Adhesion samples were then prepared by placing two pieces of adhesive coated fabric together so that the adhesive coated surfaces were together and overlapped for 5.1 cm. The overlap was rolled with a weight of approximately 179 kg per meter width to force the adhesive surfaces into intimate contact. The adhered samples were aged at room temperature and cut into 25.4 mm wide strips. The peel strength and lap shear strength of each adhesive mixture was then measured, within 1 hour or the time of forming the seam, with the results being as shown in the Table. The peel strength was run according to ASTM D 1000 at a rate of 51 mm per minute on strips that were 25.4 mm wide. The lap shear strength for the 5.1 cm overlap was run according to ASTM D 3163 at a rate of 51 mm per minute on a width of 25.4 mm at the lap.

The remaining samples were aged for 7 days at 23° C. and retested with the results shown in the Table.

The adhesives of this example were not pressure sensitive adhesives. When the coated fabric was forcefully peeled apart, the adhesive did not separate from the coated fabric as a tacky pressure sensitive surface which could be subsequently readhered to a surface by pressing the adhesive against the surface.

The adhesives of this example falling within the limits of this invention, give initial bonds having peel strengths of greater than 7.5 kg/m of width and permanent bonds having lap shear strengths of greater than 2500 Kg/m width.

TABLE

| | A | B | C | D | E | F | G | H | I* | J* |
|---|---|---|---|---|---|---|---|---|---|---|
| Composition | | | | | | | | | | |
| Gum, g | 29.5 | 27.125 | 21.7 | 19.53 | 16.3 | 15.3 | 13.02 | 10.85 | 5.43 | 2.96 |
| Resin, g | 4.92 | 9.04 | 18.1 | 21.7 | 27.125 | 28.75 | 32.55 | 36.17 | 45.21 | 49.33 |
| Xylene, g | 17.7 | 15.77 | 12.5 | 11.06 | 8.89 | 8.24 | 6.72 | 5.27 | 1.66 | 0 |
| Resin, % | 10.4 | 18.9 | 36.9 | 43.8 | 53.8 | 56.8 | 63.6 | 70.0 | 85.3 | 92.1 |
| Gum, % | 89.6 | 81.1 | 63.1 | 56.2 | 46.2 | 43.2 | 36.4 | 30.0 | 14.7 | 7.9 |
| Crosslinker, parts | 3.03 | 2.99 | 2.91 | 2.88 | 2.83 | 2.82 | 2.79 | 2.76 | 2.70 | 2.67 |
| Catalyst, parts | 0.76 | 0.75 | 0.73 | 0.72 | 0.71 | 0.71 | 0.70 | 0.69 | 0.68 | 0.67 |
| SiH/SiOH, ratio | 1.72 | 0.78 | 0.46 | 0.39 | 0.31 | 0.29 | 0.26 | 0.23 | 0.19 | 0.17 |
| Initial Properties | | | | | | | | | | |
| Peel, kg/m | 16 | 68 | 8.9 | 8.9 | 14 | 12 | 11 | 18 | 3.6 | 3.6 |
| Lap Shear, kg/m | 804 | 643 | 179 | 179 | 164 | 157 | 167 | 161 | 95 | 3.6 |
| Properties after 1 week | | | | | | | | | | |
| Peel kg/m | 232 | 221 | 170 | 159 | 157 | 143 | 170 | 63 | 18 | 3.6 |
| Lap Shear, kg/m | 3214 | 3393 | 3303 | 2679 | 3214 | 2947 | 3393 | 3393 | 250 | 3.6 |

*Comparative composition

EXAMPLE 2

A comparative example was prepared by repeating the composition of Example 1, composition F, and comparing it to an identical composition K except for the use of a lower viscosity polydimethylsiloxane fluid having a viscosity of approximately 50 Pa.s at 23° C. in K in place of the polydimethylsiloxane fluid in F. The two compositions were prepared and tested as in Example 1 with these results:

| Composition | F | K* |
|---|---|---|
| Initial Properties | | |
| Peel, kg m width | 11 | 7.2 |
| Lap, kg m width | 184 | 116 |
| Properties after 1 week | | |
| Peel, kg m width | 125 | 104 |
| Lap, kg m width | 3661 | 2464 |

*Comparative example

Composition K, made with a low viscosity polydimethylsiloxane fluid, did not yield sufficient initial bond or permanent bond.

EXAMPLE 3

A series of samples were prepared using a treated colloidal silica to reinforce the adhesive.

Composition L was a repeat of composition F with the addition of 1.62 g of a colloidal silica having a surface area of about 250 m²/g and a surface treated with trimethylsiloxy units. This was equivalent to 4.6 parts by weight of filler per 100 parts by weight of the gum and resin combined.

Composition M was a repeat of composition F with 1.62 g of the resin removed and replaced with 1.62 g of the treated silica of L. This was equivalent to 4.8 parts by weight of filler per 100 parts by weight of the gum and resin combined. The composition has 45.7 percent gum and 54.3 percent resin.

Composition N was a repeat of composition L except there was no resin added. This formulation gelled immediately upon mixing. The SiH/SiOH ratio was 278.

Compositions L and M were coated on coated glass fabric as in Example 1 and tested as in Example 1 with these results:

| Composition | L | M |
|---|---|---|
| Initial Properties | | |
| Peel, kg/m | 7.8 | 7.8 |
| Lap Shear, kg/m | 131 | 95 |
| Properties after 1 week | | |
| Peel, kg/m | 191 | 220 |
| Lap Shear, kg/m | 3679 | 2625 |

EXAMPLE 4

A comparative composition in which the resin of composition F was replaced with the gum of composition F gelled immediately upon mixing of the crosslinker and catalyst into the mixture. This mixture had a SiH/SiOH ratio of 278.

The resin must be present to allow the mixture to be successfully catalyzed and applied.

EXAMPLE 5

Composition F was coated onto pieces of material to be bonded together as in Example 1 except the coated glass fabric was replaced by a sheet of polyvinyl chloride (PVC) and by a sheet of polytetrafluoroethylene (PTFE). The properties resulting from the bonded seams produced, tested as in Example 1, were:

| Substrate | PVC | PTFE |
|---|---|---|
| Initial Properties | | |
| Peel, kg/m | 6.4 | 2.7 |
| Lap Shear, kg/m | 116 | 127 |
| Properties after 1 week | | |
| Peel, kg/m | 8.9 | 219 |
| Lap Shear, kg/m | 268 | 2554 |

The poor properties on the polyvinylchloride sheet after 1 week aging are thought to be due to leaching of plasticizer from the sheet into the adhesive.

EXAMPLE 6

A comparative example was prepared using another type of silicone adhesive, requiring a different method, to form a seam.

The adhesive used was a commercial room temperature curing adhesive and caulking material that cured upon exposure to the atmosphere, giving off acetic acid during the cure. Pieces of the coated glass fabric of Example 1 were coated with a 0.38 mm thick layer of the adhesive by using a doctor blade. Second pieces of the coated glass fabric were immediately placed over the exposed surface of the adhesive and the seam formed was rolled under a weight which applied a force of 179 kg/m of seam width to the seam to insure intimate contact between the adhesive and the two coated cloth surfaces.

The adhered samples were then allowed to cure for 1 hour and for 7 days, cut into test samples, and measured as in Example 1. The results were:

| Initial Properties | |
| --- | --- |
| Peel, kg/m | 0.27 |
| Lap Shear, kg/m | 30 |
| Properties after 1 week | |
| Peel, kg/m | 219 |
| Lap shear, kg/m | 3572 |

This example shows that this type of adhesive does not develop sufficient strength to allow successful fabrication of seams because the strength is too low during the early cure period. The adhesive does develop satisfactory adhesion after it is cured.

EXAMPLE 7

When composition F was repeated but using 4 parts of crosslinker in place of the 2.82 parts used in Example 1, the adhesive was too stiff and brittle to function as a seam adhesive. Composition F in Example 1 contained 0.045 g of hydrogen atom silicon per 100 g of resin plus gum while the composition of this example contained 0.064 g of hydrogen atoms per 100 g of resin plus gum.

EXAMPLE 8

An adhesive base was prepared by mixing together 29.9 parts by weight of the hydroxyl endblocked polydimethylsiloxane gum of Example 1, 33.7 parts of the benzene soluble resin copolymer of Example 1, 32.4 parts of xylene, 3.8 parts of isopropanol and 0.16 parts of the condensation catalyst of Example 1. The adhesive base had a hydroxyl content of about 1.45 percent by weight and a solids content of about 60 percent by weight. This adhesive base is a commercial adhesive use to produce silicone pressure sensitive adhesives in conjunction with an organic peroxide catalyst.

An adhesive of this invention was prepared by mixing 50 g of the above adhesive base with 1 g of the polymethylhydrogensiloxane of Example 1 and 0.25 g of dibuthyltindiacetate, giving an SiH/SiOH ratio of about 0.352, and about 0.049 g H per 100 g of resin plus polymer. The catalyzed adhesive was mixed for one minute, then applied to the surfaces of two pieces of coated fabric, the outer surface of the coated fabric consisting of the elastoplastic organopolysiloxane of Example 1. The adhesive was allowed to air dry until tacky enough that the adhesive no longer formed "strings" when touched with the finger and the finger was withdrawn, then the two adhesive surfaces were placed together to form overlapping seams. The seams were rolled with a metal roller to cause intimate contact between the adhesive surfaces, then samples for measuring peel strength and lap shear strength were cut from the seamed coated fabric. Test samples were then measured within one hour of their preparation to yield initial peel strengths of between 11.6 to 12.5 kg/m of width and initial lap shear strengths between 116 to 125 kg/m of width. Additional test samples were allowed to cure at room temperature for 7 days. After this curing period, the samples yielded a lap shear strength averaging 4463 kg/m of width.

This example shows that the method of this invention, using the adhesive of this invention, yields a bonded seam between pieces of fabric coated with elastoplastic organopolysiloxane resin that has an initial peel strength of at least 7.5 kg/m of width and an aged lap shear strength for a 50.8 mm lap of at least 2500 kg/m of width.

That which is claimed is:

1. A method of providing both an initial bond and a permanent bond with one adhesive between two surfaces, at least one surface being a resin selected from the group consisting of an elastoplastic organopolysiloxane resin and a polytetrafluoroethylene resin, consisting essentially of
(A) applying to the surfaces to be bonded a sufficient amount of a single permanent-bond adhesive to yield a coating of at least 0.1 mm thickness per surface, the adhesive consisting essentially of the product obtained by mixing
  (i) 9 to 70 percent by weight of a hydroxyl radical containing solid benzene soluble resin copolymer consisting essentially of $R_3SiO_{\frac{1}{2}}$ units and $SiO_{4/2}$ units where R is a monovalent hydrocarbon radical containing no more than 6 carbon stoms, there being from 0.6 to 0.9 inclusive
    $R_3SiO_{\frac{1}{2}}$ units for every
    $SiO_{4/2}$ units,
    at least 95 percent of all R radicals in (i) being methyl,
  (ii) 30 to 91 percent by weight of a polydiorganosiloxane of the formula

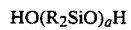
    $HO(R_2SiO)_aH$ where R is as defined above, a has an average value such that (ii) has a viscosity of greater than 10,000 Pa.s at 25° C.,
  (iii) 0.75 to 8 parts by weight based upon 100 parts by weight of (i) plus (ii) of an organohydrogenpolysiloxane compatible with the mixture of (i) and (ii) and having an average unit formula

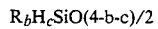
    $R_bH_cSiO_{(4-b-c)/2}$ where R is as defined above, b has a value of from 1.00 to less than 2.00, c has a value of from 0.3 to 1.00, the sum of b plus c being from 1.30 to less than 3.00, there being an average of greater than two silicon bonded hydrogen atoms per molecule of (iii), no silicon atom bearing more than one silicon bonded hydrogen atom, the mole ratio of SiH units in (iii) to SiOH units in (i) and (ii) being from 0.2/1 to 1/1, and the weight of hydrogen atoms present on silicon being less than 0.05 g per 100 g of (i) plus (ii),
  (iv) 0.5 to 2 parts by weight based upon 100 parts by weight of (i) plus (ii) of a soluble tin catalyst, and
  (v) sufficient non-reactive solvent for the mixture of (i), (ii), (iii), and (iv), to yield a flowable adhesive having a combination of viscosity and solids content such that a single application of adhesive can yield an adhesive thickness at least 0.1 mm,
(B) allowing the solvent to evaporate until tacky adhesive surfaces are formed, then (C) placing the adhesive surfaces together while the adhesive is tacky, obtaining an initial load-bearing bond then (D) allowing the adhesive to further cure to give a permanent bond.

2. The method of claim 1 in which one surface is the elastoplastic organopolysiloxane resin which is the cured product obtained by exposing to atmospheric moisture a composition comprising an organosiloxane block copolymer consisting essentially of (F) 40 to 75 inclusive mole percent of diorganosiloxane units wherein the diorganosiloxane units are bonded through silicon-oxygen-silicon bonds forming a polydiorganosiloxane block having an average of from 15 to 350 inclusive diorganosiloxane units per block, said polydiorganosiloxane being at least 80 mole percent dimethylsiloxane units based on the total number of siloxane units in the polydiorganosiloxane and any remaining units being selected from the group consisting of phenylmethylsiloxane units and monomethylsiloxane units, (G) 15 to 50 inclusive mole percent organosiloxane units having an average formula

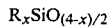

$$R_xSiO_{(4-x)/2}$$

where x has a value of from 1 to 1.3 inclusive and R is an organic group selected from the group consisting of aryl radicals, vinyl radicals, methyl radicals, ethyl radicals and propyl radicals, said organic groups being at least 50 percent aryl radicals based on the total number of organic groups in (G), said organosiloxane units comprise a block of at least three organosiloxane units and said organosiloxane units being selected from monoorganosiloxane units and diorganosiloxane units, and (H) 3 to 25 inclusive mole percent of end-blocking siloxane units of the formula

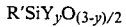

$$R'SiY_yO_{(3-y)/2}$$

where y has an average value from 1.8 to 2 inclusive, R' is an organic radical selected from the group consisting of alkyl radicals having from one to five inclusive carbon atoms, phenyl radicals and vinyl radicals and Y is a monovalent radical selected from the group consisting of acetoxy radicals, alkoxy radicals having from one to five inclusive carbon atoms per radical, and radicals of the formula —O—N=X wherein X is selected from the group consisting of radicals of the formula

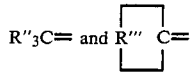

in which each R''' is selected from the group consisting of divalent hydrocarbon radicals and halogenated divalent hydrocarbon radicals and each R'' is a radical selected independently from the group consisting of monovalent hydrocarbon radicals and halogenated monovalent hydrocarbon radicals, the mole percentages of (F), (G) and (H) being based on the total number of siloxane units in the organosiloxane block copolymer.

3. The method of claim 2 in which (F) is present in an amount of from 50 to 70 inclusive mole percent and the polydiorganosiloxane is polydimethylsiloxane having from 25 to 100 dimethylsiloxane units per block, (G) is present in an amount of from 20 to 40 inclusive mole percent and the aryl radicals are phenyl radicals and (H) is present in an amount of from 4 to 20 inclusive mole percent.

4. The method of claim 1 in which step (C) comprises forcing the adhesive surfaces together into intimate contact while the adhesive is tacky, obtaining an initial load-bearing bond.

5. The method of claim 1 in which both surfaces being bonded together are elastoplastic organopolysiloxane resin.

6. The method of claim 1 in which the resin surface is the surface of a membrane.

7. The method of claim 6 in which the membrane is reinforced with fabric.

8. The method of claim 2 in which both surfaces being bonded together are the elastoplastic organopolysiloxane resin.

9. The method of claim 8 in which the resin surfaces are the surface of a membrane.

10. The method of claim 9 in which the membrane is reinforced with fabric.

11. The method of claim 3 in which both surfaces being bonded together are the elastoplastic organopolysiloxane resin.

12. The method of claim 11 in which the resin surfaces are the surface of a membrane.

13. The method of claim 12 in which the membrane is reinforced with fabric.

14. The method of claim 1 in which the resin is polytetrafluoroethylene.

15. The method of claim 2 in which the initial bond has a peel strength of at least 7.5 kilograms per meter of width and the permanent bond has a lap shear strength for 50.8 millimeter lap of at least 2500 kilograms per meter of width.

16. The method of claim 10 in which the bonded seam has an initial peel strength of at least 7.5 kilograms per meter of width and an aged lap shear strength for a 50.8 millimeter lap of at least 2500 kilograms per meter of width.

17. The method of claim 13 in which the bond has an initial peel strength of at least 7.5 kilograms per meter of width and an aged lap shear strength for 50.8 millimeter lap of at least 2500 kilograms per meter of width.

18. The method of claim 1 in which (i) is from 10 to 60 percent by weight, (ii) is from 40 to 90 percent by weight, (iii) is from 2 to 6 parts by weight of organohydrogenpolysiloxane in which R is methyl, b has a value of from 1.05 to 1.4, c has a value of from 0.45 to 0.97, b plus c has a value of from 1.6 to 2.1, (iv) is from 0.5 to 1.5 parts by weight of a dialkyltindicarboxylate, and (v) is a hydrocarbon solvent sufficient to give an adhesive solids content of from 40 to 60 percent by weight.

19. The method of claim 10 in which (i) is from 10 to 60 percent by weight, (ii) is from 40 to 90 percent by weight, (iii) is from 2 to 6 parts by weight of organohydrogenpolysiloxane in which R is methyl, b has a value of from 1.05 to 1.4, c has a value of from 0.45 to 0.97, b plus c has a value of from 1.6 to 2.1, (iv) is from 0.5 to 1.5 parts by weight of a dialkyltindicarboxylate, and (v) is a hydrocarbon solvent sufficient to give an adhesive solids content of from 40 to 60 percent by weight.

20. The method of claim 13 in which (i) is from 10 to 60 percent by weight, (ii) is from 40 to 90 percent by weight, (iii) is from 2 to 6 parts by weight of organohydrogenpolysiloxane in which R is methyl, b has a value of from 1.05 to 1.4, c has a value of from 0.45 to 0.97, b plus c has a value of from 1.6 to 2.1, (iv) is from 0.5 to 1.5 parts by weight of a dialkyltindicarboxylate, and (v) is a hydrocarbon solvent sufficient to give an adhesive solids content of from 40 to 60 percent by weight.

21. The bonded surfaces obtained by the method of claim 1.

22. The bonded surfaces obtained by the method of claim 7 in which the surfaces form a seam.

23. The bonded surfaces obtained by the method of claim 10 in which the surfaces form a seam.

24. The bonded surfaces obtained by the method of claim 13 in which the surfaces form a seam.

25. The bonded surfaces of claim 15.

26. The bonded surfaces of claim 15 in which the surfaces form a seam.

27. The bonded surfaces of claim 16 in which the surfaces form a seam.

28. A method of providing both an initial bond and a permanent bond with one adhesive between two surfaces at least one surface being a resin selected from the group consisting of an elastoplastic organopolysiloxane resin and a polytetrafluoroethylene resin, consisting of (A) applying to the surfaces to be bonded a sufficient amount of a single permanent-bond adhesive to yield a coating of at least 0.1 mm thickness per surface, the adhesive consisting essentially of the product obtained by mixing (i) 9 to 70 percent by weight of a hydroxyl radical containing solid benzene soluble resin copolymer consisting essentially of $R_3SiO_{\frac{1}{2}}$ units and $SiO_{4/2}$ units where R is a monovalent hydrocarbon radical containing no more than 6 carbon atoms, there being from 0.6 to 0.9 inclusive $R_3SiO_{\frac{1}{2}}$ units for every $SiO_{4/2}$ units, at least 95 percent of all R radicals in (i) being methyl, (ii) 30 to 91 percent by weight of a polydiorganosiloxane of the formula $$HO(R_2SiO)_aH$$

where R is as defined above, a has an average value such that (ii) has a viscosity of greater than 10,000 Pa.s at 25° C., (iii) 0.75 to 8 parts by weight based upon 100 parts by weight of (i) plus (ii) of an organohydrogenpolysiloxane compatible with the mixture of (i) and (ii) and having an average unit formula $$R_bH_cSiO_{(4-b-c)/2}$$

where R is as defined above, b has a value of from 1.00 to less than 2.00, c has a value of from 0.3 to 1.00, the sum of b plus c being from 1.30 to less than 3.00, there being an average of greater than two silicon bonded hydrogen atoms per molecule of (iii), no silicon atom bearing more than one silicon bonded hydrogen atom, the mole ratio of SiH units in (iii) to SiOH units in (i) and (ii) being from 0.2/1 to 1/1, and the weight of hydrogen atoms present on silicon being less than 0.05 g per 100 g of (i) plus (ii), (iv) 0.5 to 2 parts by weight based upon 100 parts by weight of (i) plus (ii) of a soluble tin catalyst, and (v) sufficient non-reactive solvent for the mixture of (i), (ii), (iii), and (iv), to yield a flowable adhesive having a combination of viscosity and solids content such that a single application of adhesive can yield an adhesive thickness at least 0.1 mm, (B) allowing the solvent to evaporate until tacky adhesive surfaces are formed, then (C) placing the adhesive surfaces together while the adhesive is tacky, obtaining an initial load-bearing bond then (D) allowing the adhesive to further cure to give a permanent bond.

29. A permanent-bond adhesive consisting essentially of the product obtained by mixing (i) 9 to 70 percent by weight of a hydroxyl radical containing solid benzene soluble resin copolymer consisting essentially of $R_3SiO_{\frac{1}{2}}$ units and $SiO_{4/2}$ units where R is a monovalent hydrocarbon radical containing no more than 6 carbon atoms, there being from 0.6 to 0.9 inclusive $R_3SiO_{\frac{1}{2}}$ units for every $SiO_{4/2}$ units, at least 95 percent of all R radicals in (i) being methyl, (ii) 30 to 91 percent by weight of a polydiorganosiloxane of the formula $$HO(R_2SiO)_aH$$

where R is as defined above, a has an average value such that (ii) has a viscosity of greater than 10,000 Pa.s at 25° C., (iii) 0.75 to 8 parts by weight based upon 100 parts by weight of (i) plus (ii) of an organohydrogenpolysiloxane compatible with the mixture of (i) and (ii) and having an average unit formula $$R_bH_cSiO_{(4-b-c)/2}$$

where R is as defined above, b has a value of from 1.00 to less than 2.00, c has a value of from 0.3 to 1.00, the sum of b plus c being from 1.30 to less than 3.00, there being an average of greater than two silicon bonded hydrogen atoms per molecule of (iii), no silicon atom bearing more than one silicon bonded hydrogen atom, the mole ratio of SiH units in (iii) to SiOH units in (i) and (ii) being from 0.2/1 to 1/1, and the weight of hydrogen atoms present on silicon being less than 0.05 g per 100 g of (i) plus (ii), (iv) 0.5 to 2 parts by weight based upon 100 parts by weight of (i) plus (ii) of a soluble tin catalyst, and (v) sufficient non-reactive solvent for the mixture of (i), (ii), (iii), and (iv), to yield a flowable adhesive having a combination of viscosity and solids content such that a single application of adhesive can yield an adhesive thickness of at least 0.1 mm.

30. The permanent-bond adhesive of claim 29 in which (i) is from 10 to 60 percent by weight, (ii) is from 40 to 90 percent by weight, (iii) is from 2 to 6 parts by weight of organohydrogenpolysiloxane in which R is methyl, b has a value of from 1.05 to 1.4, c has a value of 0.45 to 0.97, b plus c has a value of from 1.6 to 2.1, (iv) is from 0.5 to 1.5 parts by weight of a dialkyltindicarboxylate, and (v) is a hydrocarbon solvent sufficient to give an adhesive solids content of from 40 to 60 percent by weight.

31. A pemanent-bond adhesive consisting of the product obtained by mixing (i) 9 to 70 percent by weight of a hydroxyl radical containing solid benzene soluble resin copolymer consisting essentially of $R_3SiO_{\frac{1}{2}}$ units and $SiO_{4/2}$ units where R is a monovalent hydrocarbon radical containing no more than 6 carbon atoms, there being from 0.6 to 0.9 inclusive
$R_3SiO_{\frac{1}{2}}$ units for every
$SiO_{4/2}$ units,
at least 95 percent of all R radicals in (i) being methyl, (ii) 30 to 91 percent by weight of a polydiorganosiloxane of the formula $$HO(R_2SiO)_aH$$

where R is as defined above, a has an average value such that (ii) has a viscosity of greater than 10,000 Pa.s at 25° C., (iii) 0.75 to 8 parts by weight based upon 100 parts by weight of (i) plus (ii) of an organohydrogenpolysiloxane compatible with the mixture of (i) and (ii) and having an average unit formula $$R_bH_cSiO_{(4-b-c)/2}$$

where R is as defined above, b has a value of from 1.00 to less than 2.00, c has a value of from 0.3 to 1.00, the sum of b plus c being from 1.30 to less than 3.00, there being an average of greater than two silicon bonded hydrogen atoms per molecule of (iii), no silicon atom bearing more than one silicon bonded hydrogen atom, the mole ratio of SiH units in (iii) to SiOH units in (i) and (ii) being from 0.2/1 to 1/1, and the weight of hydrogen atoms present on silicon being less than 0.05 g per 100 g of (i) plus (ii), (iv) 0.5 to 2 parts by weight based upon 100 parts by weight of (i) plus (ii) of a soluble tin catalyst, and (v) sufficient non-reactive solvent for the mixture of (i), (ii), (iii), and (iv), to yield a flowable adhesive having a combination of viscosity and solids content such that a single application of adhesive can yield an adhesive thickness of at least 0.1 mm.

* * * * *

UNITED STATES PATENT AND TRADEMARK OFFICE
CERTIFICATE OF CORRECTION

PATENT NO. : 4,613,534
DATED : September 23, 1986
INVENTOR(S) : Blizzard et al.

It is certified that error appears in the above-identified patent and that said Letters Patent is hereby corrected as shown below:

Col. 8, Line 50: "$Me_3SiO_k$" should read "$Me_3SiO_{1/2}$".

Signed and Sealed this

Eleventh Day of August, 1987

*Attest:*

DONALD J. QUIGG

*Attesting Officer*  *Commissioner of Patents and Trademarks*